June 28, 1966  D. B. KUIPER  3,257,808
FLUID COUPLING FAN DRIVE
Filed April 13, 1964  2 Sheets-Sheet 1
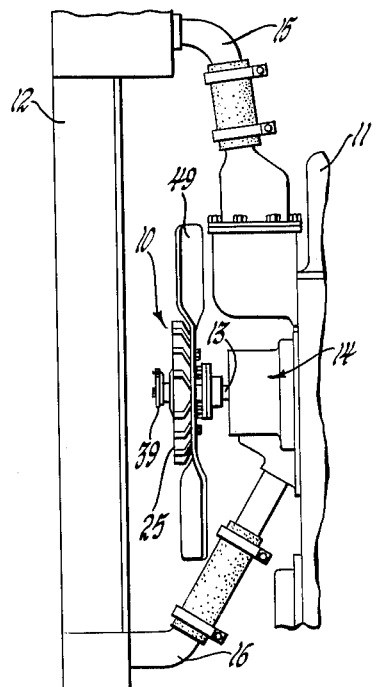
Fig.1
Fig.3
Fig.4
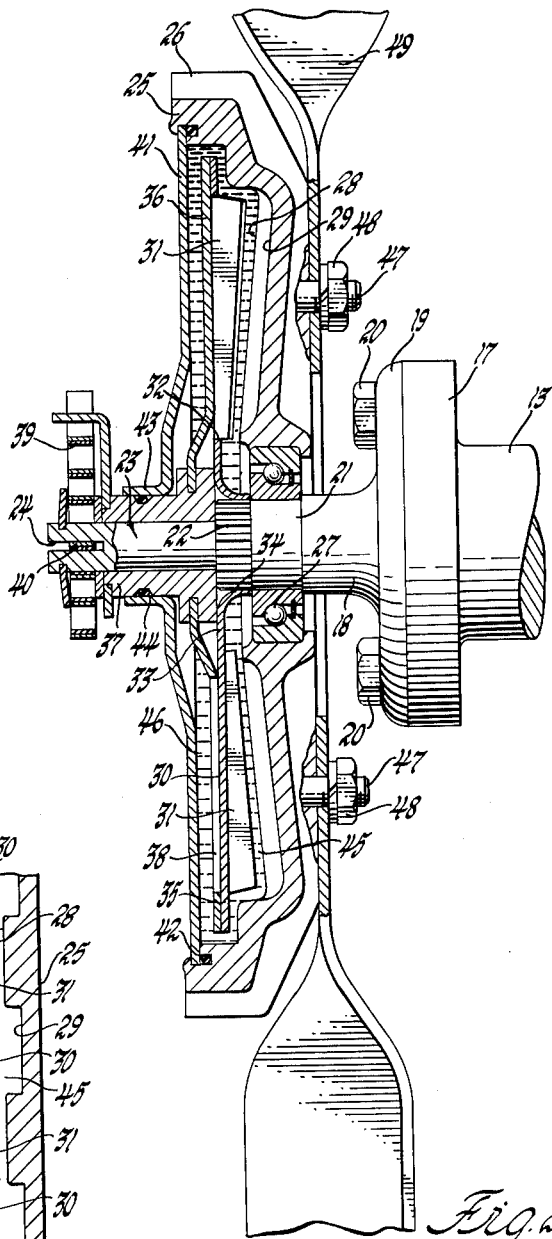
Fig.2
INVENTOR.
Dan B. Kuiper
BY
Robert L. Spencer
ATTORNEY June 28, 1966 D. B. KUIPER 3,257,808
FLUID COUPLING FAN DRIVE
Filed April 13, 1964 2 Sheets-Sheet 2
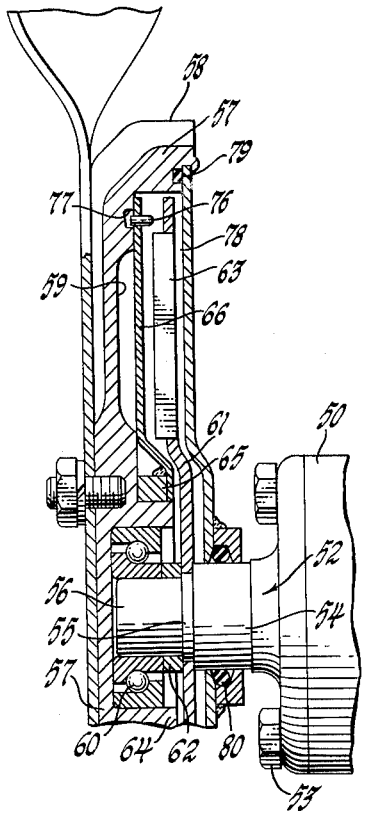
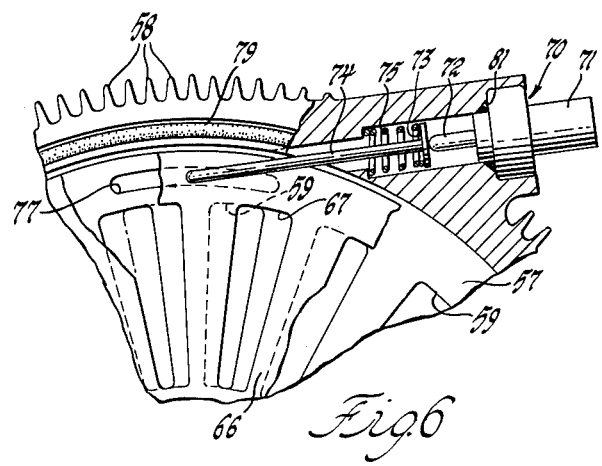
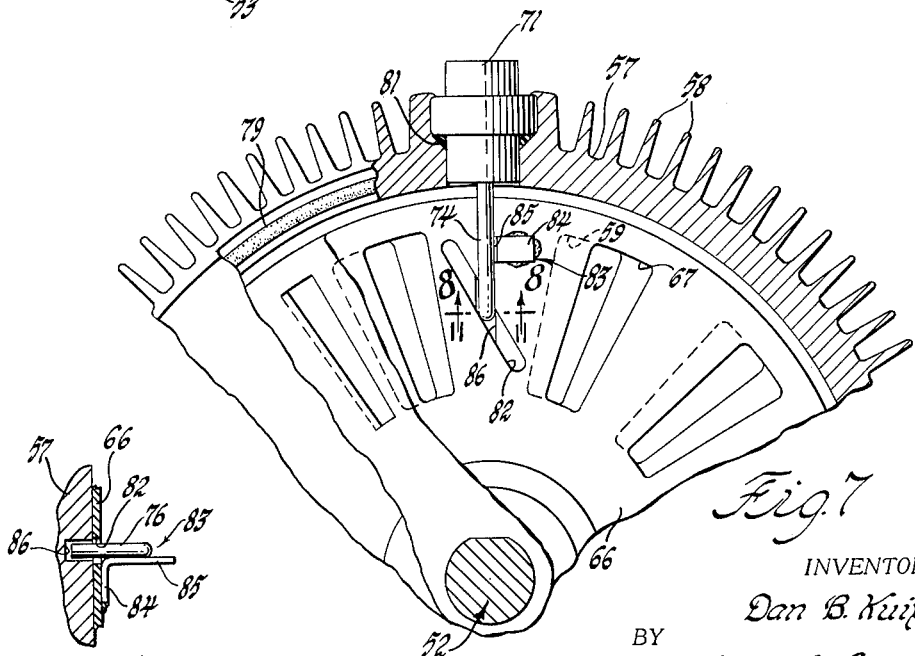
INVENTOR.
Dan B. Kuiper
BY
Robert L. Spencer
ATTORNEY United States Patent Office 3,257,808
Patented June 28, 1966

3,257,808
FLUID COUPLING FAN DRIVE
Dan B. Kuiper, Grand Rapids, Mich., assignor to General Motors Corporation, Detroit, Mich., a corporation of Delaware
Filed Apr. 13, 1964, Ser. No. 359,100
11 Claims. (Cl. 60—54)

This invention relates to variable speed drive mechanisms and is particularly adapted for use in a fan drive for an automotive vehicle.

Several types of variable speed fan drives have been heretofore proposed for use in automotive vehicles. These arrangements have generally been of complicated structure, expensive to manufacture and maintain, noisy and have objectional rough engagement characteristics when the fan is being engaged.

An object of this invention is to provide a variable speed drive unit which is of simple construction, is economical to manufacture, and has long useful life and low maintenance requirements.

Another object of this invention is to provide a fan drive arrangement incorporating a rotatable disc valve for controlling the speed of rotation of the fan.

A further object of this invention is to provide a fan drive incorporating a disc impeller and a disc control valve of low manufacturing cost and which may be formed of sheet metal stampings.

A more particular object of this invention is to provide a rotatable fan drive housing having spaced walls subjected to circulating fluid wherein one wall is of relatively smooth configuration and a second wall is of relatively rough configuration together with a rotatable disc valve adapted to be rotated relative to the housing to control the fan speed by varying the effective fluid drag presented by the housing wall of relatively rough configuration.

An additional object of this invention is to provide a fan drive of the type described wherein the disc valve is rotated relative to the housing by temperature responsive power means to vary the fan speed in accordance with engine cooling requirements.

A more particular object of this invention is to provide a disc valve having openings or windows therethrough adapted to be rotated relative to a housing to vary the effective size of the window opening to control the fluid flow through the opening.

A specific object of this invention is to provide a hydraulic variable speed fan drive having a housing formed to provide chamber portions having walls affording different resistance to fluid circulation and to provide a disc valve having windows therein and rotatable relative to the housing to at times cause fluid to be circulated through only the chamber portion having walls affording minimum resistance to fluid circulation and having temperature responsive means for positioning the valve to permit fluid flow through the windows to increase the resistance to fluid circulation in the housing.

These and other objects and advantages of this invention will be apparent from the following specification and claims, taken in conjunction with the accompanying drawings, in which:

FIGURE 1 is a side elevation illustrating the fan drive assembly mounted on an engine for driving an engine fan.

FIGURE 2 is a sectional view through a drive unit constructed in accordance with the principles of this invention.

FIGURE 3 is a sectional view through the fan drive housing illustrating the disc valve in its fully closed position.

FIGURE 4 is a sectional view through the fan drive housing illustrating the disc valve in its fully open position.

FIGURE 5 is a sectional view through a modified embodiment of the invention.

FIGURE 6 is an end view of the FIGURE 5 embodiment, partially in section and wherein the housing cover and impeller have been removed from the assembly and the disc valve and housing are partially broken away.

FIGURE 7 is an end view similar to FIGURE 6 wherein a modified valve control mechanism is illustrated.

FIGURE 8 is a sectional view taken along the line 8—8 of FIGURE 7.

Referring to FIGURE 1, there is shown a typical fan drive assembly constructed in accordance with the principles of this invention as installed in a vehicle. As shown, the fan drive assembly indicated generally at 10 is disposed between an engine 11 and a radiator 12. The assembly is preferably driven off a water pump drive shaft 13 which is engine driven to drive a water pump 14 for circulating coolant through the engine and through water passages 15 and 16 and through radiator 12.

As shown in FIGURE 2, water pump drive shaft 13 carries a mounting flange 17 adapted to receive a mounting flange 19 on a fan impeller drive shaft 18. Shaft 18 is mounted on the end of shaft 13 by means of bolts 20. Shaft 18 is provided with a recessed bearing support surface 21, a splined surface 22 and a stem 23 of reduced diameter having a slot 24 therein. A housing 25 which may be die cast having cooling fins 26 thereon is rotatably supported upon shaft 18 by means of a roller bearing 27. As best shown in FIGURES 2 and 3, housing 25 has cast thereon a plurality of alternately spaced upstanding raised wall portions 28 and recesses 29 along the side wall thereof, such that the radial depressions form a series of pockets for contact with fluid. An impeller 30 comprises a solid metal disc having a series of blades 31 stamped upwardly from the plane of the disc to provide openings or windows 32 through the disc. Impeller disc 30 extends radially inwardly from angular blades 31 and is bent over in its hub portion 33 as at 34 to contact the serrations or splines 22 on shaft 18. Thus, hub portion 33 constitutes a solid annular portion and is driven by shaft 18. Also, disc impeller 30 presents a solid annular surface 35 outwardly from windows 32. It is contemplated that ten equally spaced blades 31 be struck up from the plane of disc impeller 30 to provide ten equally spaced windows 32 through the disc.

A disc valve 36 carried by a sleeve hub 37 extends parallel to and in contact with impeller 30, the disc valve being disposed on the side of impeller 30 opposite to the upstanding bent up blades 31. Disc valve 36 is provided with a plurality of cut out segments or openings 38 therethrough corresponding in number to the windows 32 in impeller 30. Openings 38 in valve 36 are in alignment with openings 32 in impeller 30. A temperature responsive power element in the form of a bimetal spring 39 is provided to control the angular rotation of valve 36 with respect to impeller 30. Spring 39 has one end 40 disposed in slot 24 and another end connected to sleeve 37. It will be apparent that both impeller disc 30 and valve disc 36 are driven by shaft 18 and rotate at the speed of rotation of shaft 18. A stamped sheet metal cover 41 is carried by housing 25, there being an annular seal 42 adjacent the periphery of the disc shaped cover 41 and housing 25 and a second annular seal 44 between an axially extending boss 43 on cover 41 and sleeve 37. It will be apparent that two fluid chamber portions 45 and 46 are provided. As stated, housing 25 which forms one wall of chamber portion 45 is provided with a series of radial depressions 29 and radially upstanding axially protruding raised wall portions 28 forming axially extending pockets for presenting a relatively rough surface adapted to be acted upon by fluid in chamber portion 45. On the other hand, cover 41 presents a relatively flat or smooth wall for chamber portion 46.

Bimetallic spring 39 is adapted to rotate sleeve 37 and disc valve 36 through a limited angular rotation relative to impeller 30 to vary the degree of registration of windows 32 in impeller 30 and windows 38 in disc valve 36 in accordance with changes in temperature of spring 39. At temperatures above a maximum predetermined temperature, spring 39 will rotate valve 36 such that the windows or passages 32 through impeller 30 are blocked off as illustrated in FIGURE 3. At temperatures below a minimum predetermined temperature, spring 39 will rotate disc valve 36 to position windows 38 of valve 36 into full registry with windows 32 of impeller 30 as shown in FIGURE 4. In the FIGURE 4 position, maximum fluid flow is permitted from chamber portion 45 to chamber portion 46 through the windows. With valve 36 in the FIGURE 3 position no fluid flow is permitted through valve 36 from chamber portion 45 to chamber portion 46 through the windows. In temperature ranges intermediate these two minimum and maximum predetermined temperatures, the valve 36 will be in various positions intermediate the fully closed and fully opened positions illustrated.

Assuming impeller 30 to be rotated counterclockwise as viewed from right in FIGURE 2 the blades 31, which are disposed at an acute angle to the plane of impeller disc 30 will tend to scoop up working fluid from chamber portion 45 and force the same through windows 32, 38 into chamber portion 46. If valve 36 is closed, as shown in FIGURE 3, the fluid through the windows will be blocked. Due to the relatively rough wall of chamber portion 45 formed by recesses 29 and wall projections 28, the effective fluid drag acting on housing 25 will be maximum. With valve 36 fully open a maximum quantity of working fluid will be pumped through windows 32, 38 by vanes 31. Since disc valve 36 and cover 41 are of smooth configuration, the effective fluid drag will be minimum. Thus, with valve 36 closed, housing 25 will be rotated at a higher speed of rotation for a given speed of rotation of shaft 18 than when valve 36 is fully opened. The speed of rotation of housing 25 will vary relative to the speed of shaft 18 depending upon the degree of opening of valve 36 relative to impeller 30. Fan blades 49 are mounted on housing 25 by means of suitable studs 47 and nuts 48.

In FIGURES 5 and 6, there is shown a second embodiment of the invention wherein the temperature responsive power element and disc valve rotate at the speed of rotation of the driven fan rather than at the speed of rotation of the power input shaft.

Referring to FIGURE 5, an engine driven shaft 50 supports a fan drive input shaft 52 by means of bolts 53. Shaft 52 includes stepped portions 54, 55, 56 of different diameter. A fan drive housing 57 having a cooling fin 58 formed thereon is die cast of metal having good heat transmitting characteristics, preferably aluminum. As in the case of the embodiment in FIGURES 2 through 4, housing 57 has a plurality of spaced radially and axially extending depressions 59 formed in one wall thereof. A roller bearing 60 supports housing 57 for rotation on portion 56 of shaft 52. A disc impeller 61 is supported on shaft 52, the impeller being fixed on shaft 52 between a spacer 62 and a shoulder formed between sections 54 and 55 of shaft 52. Disc 61 has a series of blades 63 extending therefrom in the same manner as spaced blades 31 of FIGURE 2. Impeller 61 is driven by shaft 52. Housing 57 is provided with an axially extending annular boss 64 for receiving the outer race of bearing 60 and for receiving an annular spacer 65 on the outer cylindrical surface thereof. A disc valve 66 is secured to spacer 65 as by welding such that valve 66 is supported upon boss 64 through spacer 65. As best shown in FIGURE 5, disc valve 66 is flush with a plane coextensive with outer edges or limits of the axially extending spaced pockets 59. Disc valve 66 has a plurality of spaced extending windows or openings 67 extending therethrough as best shown in FIGURE 6. Valve 66 is adapted to be rotated relative to housing 57 to dispose the windows 67 in alignment with the pockets 59 or to block off flow of fluid into the pockets 59.

Referring to FIGURE 6, there is shown a temperature responsive means indicated generally at 70 for controlling the position of valve 66 relative to pockets 59 including a temperature responsive power element of the "Vernatherm" type 71, a valve actuator rod 74 and a return spring 75. A plunger 72 on power element 71 contacts a spring seat 73 on rod 74 and moves to compress spring 75 in response to rise of temperature of power element 71. As best shown in FIGURE 5, the tip of rod 74 is bent over at 76 and extends through an opening in disc valve 66. The end of rod 76 rides in an arcuate shaped channel 77 formed in housing 57.

In FIGURE 6, disc valve 66 is positioned in an intermediate position between two possible extreme positions with respect to pockets 59. As shown, the windows 67 of valve 66 partially overlap pockets 59 to permit limited fluid flow into the pockets. At temperatures below a predetermined temperature of power element 71, spring 75 will force rod 74 to a position wherein valve 66 blocks off pockets 59 in housing 57 from fluid in impeller chamber 78. With the valve "closed," the fluid drag afforded by chamber 78 to circulation of fluid will be minimum. As the temperature of power element rises, plunger 72 will move to compress spring 75 and rotate valve 66 to increasingly register openings 67 in valve 66 with pockets 59 in housing 57. At some predetermined temperature, the windows 66 will be in full registration with pockets 59 for maximum fan drive speed. In a temperature range intermediate these two predetermined temperatures, windows 67 will progressively uncover pockets 59 in response to rise of temperature of power element 71. Here again, it will be understood that fan speed will increase relative to input shaft speed as the pockets 59 are progressively uncovered by windows 67 in valve 66, due to the increase in effective drag or resistance to fluid circulation afforded by pockets 59 as the openings 67 increase in registry with the pockets. Seals 79, 80 and 81 prevent loss of fluid from housing 57.

In FIGURES 7 and 8, there is shown an alternate rod and return spring arrangement which may be substituted for the coil spring arrangement of FIGURE 6. Parts of FIGURES 7 and 8 similar to corresponding parts found in FIGURES 5 and 6 are given similar numbers to those used in FIGURES 5 and 6.

As shown in FIGURE 7, power element 71 is disposed vertically in housing 57 and is provided with an elongated plunger 74 having a bent over end 76 extending into an elongated slot 82 formed in disc valve 66. Slot 82 extends at an angle to the path of travel of rod 74 such that valve 66 will be required to rotate relative to housing 57 in response to movement of rod plunger 74. An L-shaped spring 83 has one leg 84 thereof fixed to valve 66 and a second leg 85 thereof disposed in contact with rod 74. Leg 85 normally biases valve 66 to rotate the valve to place windows 67 of valve 66 out of registery with pockets 59 of housing 57. As power element 71 increases in temperature, rod 74 is increasingly extended into slot 82, causing valve 66 to rotate to the left as viewed in FIGURE 5 to increase the registration or overlap of windows 67 with respect to pockets 59. Spring arm 85 biases valve 66 relative to rod 74 such that the valve will rotate to close off pockets 59 at temperatures below a predetermined temperature. Bent over end 76 of rod 74 extends through inclined slot 82 of valve 66 into a straight slot 86 in housing 57, the slot 86 being directly in the path of travel of rod 74.

It will be apparent that the invention provides a simple inexpensive fan drive control wherein the parts of the assembly and particularly the impeller and disc valve may be formed of inexpensive sheet metal stampings. In all embodiments of the invention, temperature responsive means is provided for rotating the disc valve relative to the housing to vary the effective resistance to circulation of fluid by the impeller to vary fan speed rotation relative to speed of rotation of the input shaft. In all embodiments, the bent over blades of the impeller tend to pump fluid through the spaced impeller openings formed upon stamping up of the blades and direct the fluid passing through the impeller openings to the disc valve. In all embodiments, the disc valve position relative to the housing is varied by temperature responsive means to provide minimum resistance to fluid circulation in the housing when cooling requirements are minimum. Upon rise of temperature of the temperature responsive means, which indicates increased cooling requirements, the disc valve is rotated to provide increased resistance to fluid circulation or fluid drag.

For example, in the embodiment of FIGURE 2, at temperatures below a predetermined temperature, valve 36 will be open to permit fluid flow from chamber portion 45 to chamber portion 46 through the windows. Impeller blades 31 will pump fluid from chamber portion 45 to chamber portion 46 through windows 32 and 38. As the temperature rises to a temperature range above the first predetermined temperature range, valve 36 will move to progressively close off fluid flow through the windows.

In the embodiments of FIGURES 5 and 7, the valve is initially positioned relative to the housing to block off fluid flow from chamber portion 78 to chamber portion 59, when cooling is not required. As the temperature rises, power element 71 rotates the disc valve to progressively permit increased fluid flow through windows 67, 69.

What is claimed is:

1. A variable speed drive mechanism including a drive shaft, a housing supported upon said shaft for rotation at variable speeds of rotation with respect to the speed of rotation in said shaft, said housing forming a chamber and including spaced wall, a fixed quantity of working fluid in said chamber, an impeller driven by said drive shaft and disposed in said chamber between said spaced walls and in spaced relationship with respect to said housing for circulating said working fluid, spaced windows in said impeller for permitting fluid flow through said impeller, a relatively smooth surface on one of said walls presenting a minimum drag to circulation of fluid by said impeller, a relatively rough surface the other of said walls presenting a maximum drag to circulation of fluid in said chamber by said impeller, and valve means in said chamber movable to control said windows and the effective fluid drag presented to circulating fluid by said other wall.

2. A variable speed drive mechanism including a drive shaft, a housing supported on said shaft for rotation at variable speeds of rotation with respect to the speed of rotation of said shaft, said housing forming a chamber and including spaced walls, a fixed quantity of working fluid in said chamber, an impeller driven by said drive shaft and disposed in said chamber in spaced relationship with respect to said walls for circulating said working fluid in said chamber, a relatively smooth surface on one of said walls presenting minimum drag to said circulating fluid, a relatively rough surface on the other of said walls presenting maximum drag to said circulating fluid, valve means in said chamber for controlling the effective drag presented to said fluid by said relatively rough surface, and temperature responsive means for varying the position of said valve means to increase the effective fluid drag in response to rise of temperature.

3. A variable speed drive mechanism including a drive shaft, a housing supported upon said shaft for rotation at variable speeds of rotation with respect to the speed of said shaft, said housing forming a chamber and including spaced walls, a fixed quantity of fluid in said chamber, an impeller in said chamber between said spaced walls and driven by said drive shaft for circulating working fluid in said chamber, one of said walls affording greater resistance to circulation of working fluid than the other of said walls, windows through said impeller for permitting fluid flow through said impeller, valve means for controlling said windows and varying the effective resistance presented to the circulation of fluid by said first-mentioned wall, and temperature responsive means for controlling the position of said valve means to increase the effective resistance presented to said circulating fluid by said first-mentioned wall in response to rise of temperature.

4. A variable speed drive mechanism including a drive shaft, a housing supported upon said shaft for rotation at variable speeds of rotation with respect to the speed of rotation of said shaft, a fixed quantity of working fluid in said housing, an impeller in said housing driven by said shaft for circulating fluid in said housing, said housng including first and second walls adapted to be subjected to said circulating fluid, said walls having surfaces affording relatively high and relatively low resistance to circulation of said fluid, a valve in said chamber movable for controlling the effective resistance presented to the circulation of fluid by said wall having surfaces presenting relatively high resistance to circulation of fluid, and automatically operable means for controlling the position of said valve including a temperature responsive power element effective upon a rise of temperature to move said valve to increase the effective resistance to fluid circulation of said wall affording relatively high resistance to circulating fluid to thereby increase the speed of rotation of said housing relative to the speed of rotation of said power input shaft.

5. A variable speed drive mechanism including a drive shaft, a housing supported for rotation on said drive shaft, working fluid in said housing, an impeller in said housing driven by said drive shaft for circulating said working fluid, a first wall on said housing presenting minimum resistance to fluid circulation, a second wall on said housing presenting maximum resistance to circulation of said fluid, a disc valve in said housing having a plurality of spaced windows therein, said valve being rotatable with respect to said housing controlling the effective area of said windows to thereby control fluid flow through said windows, said valve being effective in one position to permit relatively unrestricted flow of fluid through said windows and movable to a second position to block off flow of fluid through said windows, said valve being disposed between said first and second walls, and automatically operable mean for controlling the position of said valve including a temperature responsive power element effective upon a rise of temperature to move said valve to vary fluid flow through said windows to thereby increase the speed of rotation of said housing relative to the speed of rotation of said power input shaft.

6. A variable speed drive mechanism including a drive shaft, a housing supported for rotation on said drive shaft, said housing forming a chamber and including spaced walls, a fixed quantity of working fluid in said chamber, an impeller in said chamber between said spaced walls and driven by said drive shaft, said impeller comprising a disc having blades thereon and having windows in said disc for permitting flow of fluid through said impeller disc, a disc valve in said chamber having windows through said disc for accommodating fluid flow through said valve, said walls presenting relatively smooth and relatively rough surfaces for receiving fluid circulated by said impeller, said disc valve being disposed in said housing intermediate said walls for controlling fluid flow therebetween, said valve being rotatable from a first position to a second position, said valve being effective in said first position to permit fluid flow from said first wall to said second wall through a fluid flow path including said impeller windows and said valve windows, said valve being effective in a second position to block off fluid flow from said first to said second wall through said fluid flow path, and automatically operable means including a temperature responsive power means effective in a first range of temperature to position said valve to block off fluid flow through said valve windows and effective in a second range of temperature to move said valve to permit fluid flow through said valve windows.

7. A variable speed drive mechanism including a drive shaft, a housing supported for rotation on said drive shaft, said housing including first and second walls enclosing a chamber, said walls presenting relatively smooth and relatively rough surfaces adapted to be acted upon by fluid circulated in said chamber, a fixed quantity of working fluid in said chamber, a disc impeller in said chamber driven by said drive shaft for circulating said fluid in said chamber, a plurality of openings in said impeller for permitting flow of fluid through said impeller, a disc valve in said chamber, a plurality of openings in said valve, said walls being disposed at opposite sides of said disc valve, said valve being effective in one position to permit fluid flow from said first wall to said second wall through a fluid flow path including said impeller openings and said valve openings, and temperature responsive means operatively connected to said disc valve, for varying the effective size of the fluid flow path through said openings in response to changes of temperature.

8. A variable speed drive mechanism including a drive shaft, a housing supported for rotation on said shaft, said housing including first and second walls forming a chamber adapted to receive working fluid, said walls having relatively rough and relatively smooth surfaces adapted to contact working fluid, a fixed quantity of working fluid in said chamber, a disc impeller driven by said shaft, a disc valve in said chamber, said valve and said disc impeller being disposed in said chamber intermediate said walls, a plurality of spaced openings through said impeller, a plurality of spaced openings through said valve, said valve being rotatable from a first position wherein circulating fluid is permitted to pass through said impeller and valve openings to a position wherein said valve blocks fluid flow through said openings, and automatic means for controlling the position of said valve including a temperature responsive means operably connected to said valve and effective at temperatures below a predetermined temperature to position said valve in one of said positions, said temperature responsive means being movable in response to rise of temperature to a temperature above said predetermined temperature to rotate said valve to said second position.

9. A variable speed drive mechanism including a drive shaft, a housing supported for rotation on said shaft, an impeller in said housing driven by said shaft, working fluid in said housing, a disc valve in said housing forming with said housing first and second chamber portions at opposite sides of said valve, a series of openings through said impeller, a series of openings through said valve, means connecting said valve to said shaft for rotation therewith, said means including temperature responsive means being effective in one range of temperature to position said valve to permit fluid flow through said impeller and valve openings and effective in a second range of temperature to position said valve to block off fluid flow through said impeller and valve openings.

10. A variable speed drive mechanism including a drive shaft, a housing supported for rotation on said shaft, an impeller in said housing driven by said shaft, working fluid in said housing, a disc impeller in said housing forming with said housing first and second chamber portions at opposite sides of said valve, a plurality of spaced openings through said impeller, a plurality of spaced openings through said disc valve, blades on said impeller for circulating working fluid in said housing and for directing working fluid from said first chamber portion to said second chamber portion through said impeller and valve openings, means connecting said valve to said shaft for rotation with said shaft, said connecting means including a temperature responsive spring effective in one range of temperature to position said disc valve to permit fluid flow from said first to said second chamber portion through said impeller and valve openings, said temperature responsive spring being effective in a second range of temperature to rotate said valve relative to said impeller to block off fluid flow through said impeller and valve openings.

11. A variable speed drive mechanism including a drive shaft, a housing supported for rotation on said shaft, an impeller in said housing driven by said shaft, working fluid in said housing, a disc valve in said housing separating said housing into first and second chamber portions, a plurality of spaced openings through said impeller, a plurality of spaced openings through said disc valve, vanes on said impeller for forcing fluid through said openings, means connecting said valve to said impeller for rotation therewith, said means including a temperature responsive power element for controlling the position of said valve with respect to said impeller, said temperature responsive means being effective in a first range of temperature to position said valve to block off fluid flow through said impeller and valve openings, said temperature responsive means being effective in a second range of temperature to position said valve relative to said housing to permit fluid flow through said impeller and valve openings.

References Cited by the Examiner
UNITED STATES PATENTS

| | | | |
|---|---|---|---|
| 2,987,887 | 6/1961 | Fowler | 60—54 |
| 2,999,361 | 9/1961 | Zierick | 60—54 |
| 3,149,465 | 9/1964 | Eshbaugh | 60—54 |

JULIUS E. WEST, *Primary Examiner.*